Dec. 4, 1923.  
A. T. HESPE  
GRADEMETER  
Filed Oct. 15, 1921

1,476,076

INVENTOR
A. T. Hespe
BY
Arthur Phelps Marr
ATTORNEY

Patented Dec. 4, 1923.

1,476,076

UNITED STATES PATENT OFFICE.

ALFRED T. HESPE, OF EAST ORANGE, NEW JERSEY.

GRADEMETER.

Application filed October 15, 1921. Serial No. 507,976.

*To all whom it may concern:*

Be it known that I, ALFRED T. HESPE, a citizen of the United States, and resident of town of East Orange, county of Essex, State of New Jersey, have invented certain new and useful Improvements in Grademeters, of which the following is the specification.

The device which is the subject of this invention has for its principal objects the indication of the grade or inclination of a road or surface over which a vehicle may be passing and in the development herein set forth I will describe the device as constructed for operation with an automobile.

It is desirable that a grademeter for the service above referred to be simple in construction and efficient and accurate in its operation.

I have employed a simple principle, that of a pendulum for my operating means as I have found that such a device combines accuracy with the positive operation.

The details of construction and additional objects accomplished by my invention will be fully set forth as the specification progress and the accompanying drawing should be referred to for a complete understanding of the specification which follows.

In the drawing.

Similar reference numerals indicate like parts in all the figures where they appear.

Figure 4:
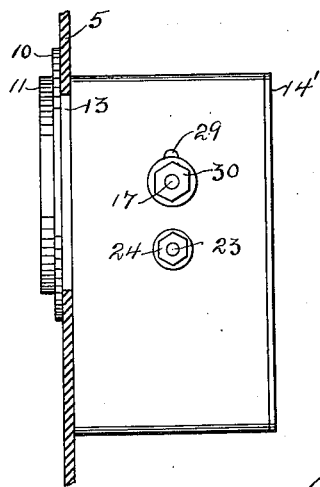
Fig. 4 is a side elevation of the completed device in operative position.

At 5 I show what may be considered a dash or instrument board of an automobile and secured upon this board by means of screws 6, 7, 8 and 9 is a ring 10 having an upstanding flange 11 and within the flange is a lense or glass or other transparent protecting means 12. As shown at 13 in Fig 4, the dash or instrument board should have a liberal perforation which will admit the introduction of the casing to be later described and will allow the indicator to be observed therethrough.

The casing 14 may be a metallic box of any desired size though its proportions as I prefer them are fairly observed in the drawings.

This casing 14 is provided with an oblong panel opening 15 in one of its narrowest sides and adjacent to this opening but within the casing I arrange a drum 16 upon a shaft 17 with freedom to be rotated thereon.

Upon the surface of the drum 16 I place a strip of material 18 which may be paper and which carries a series of figures and division 19 and sub-divisions 20.

Figure 1:
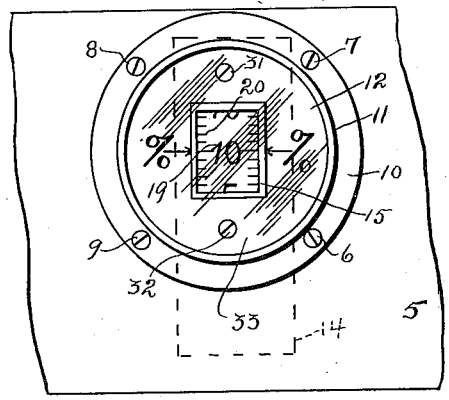
Fig. 1 is a front elevation of my device in operable position.
Figure 2:
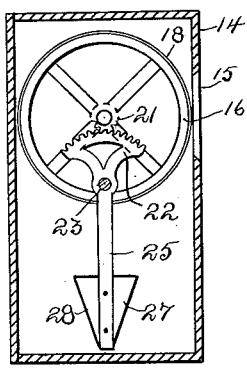
Fig. 2 is a side elevation wherein one side of the casing has been removed.
Figure 3:
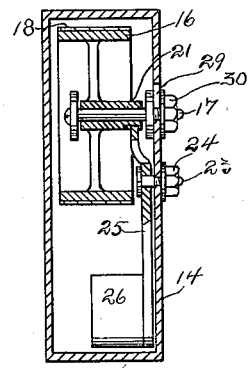
Fig. 3 is a centrally longitudinal section.

Formed integral with the hub of the drum 16 is a gear or pinion 21 which is normally in mesh with a sector 22, the sector is supported and is adapted to move freely upon a pin or stud 23 which may be secured in the casing by means of the nut 24 as shown in Fig. 3.

Formed integral with the sector 22 is an arm or pendulum 25 secured to which is the pendulum weight 26. The pendulum may be of any desired length and it will be noted that the sides 27 and 28 are tapered so as to allow the greatest possible swing to the pendulum and yet allow the casing to be made quite narrow.

It will be noted that adjacent to the shaft 17 and where this shaft extends through the casing 14 I provide the slot 29 in the side of the casing, it is in this slot that the shaft 17 is received.

In placing my device in operative position, the hole or perforation 13 is produced in the instrument board 5. Before the casing 14 is passed through this perforation 13, the nut 30 on the shaft 17 should be loosened and the shaft 17 and drum 18 should be elevated until the pinion 21 and sector 22 are out of mesh, then if the back portion 14' of the casing 14 is placed in position upon the instrument board, the pendulum 25 will assume a vertical position and thereupon the drum 16 should be rotated until the zero point is opposite the indicating arrows on the dial of the device at which time the drum and shaft should be moved downward until the pinion 21 engages the sector 22. This will insure a correct setting of the device and the compensation therein for the angularity if any of the instrument board 5.

After this adjustment, the casing 14 is passed through the perforation 13 and secured in position by screws 31 and 32 passing through the dial 33 into the casing 14 and when so secured the ring 10 and lense may be placed over the dial and the device is ready for operation.

Figure 5:
Fig. 5 shows in plan view the portion of the tape or drum face.

It will be noted that my drum is sub-divided in fives, these sub-divisions represent the per-cent of grade and it will also be noted as shown in Fig. 5 that the sub-divisions extend upon each side of the zero mark, thus my device will indicate the grade upward or downward and I may if desired change the spacings and the nature of the markings making these degrees of inclination and not per-cent of grade and I may also print the figures at one side of the zero in a different color from those at the other side of the zero.

While it is understood that modifications may be made within the scope of the appended claims without departing from the principle or sacrificing the advantages of the invention I prefer the whole as shown and described.

Having carefully and fully described my invention what I desire to obtain is as follows:

1. A grademeter having an oscillatory drum and a pendulum for oscillating it and means for releasing said drum to allow it to be moved away from said pendulum to reset said drum.

2. A grademeter including an oscillatory drum having a hub, a gear upon the hub of said drum, a toothed sector in mesh with said gear, a pendulum supported by said sector and means for supporting said gear so that it may be moved out of engagement with said sector and means for guiding said shaft during said movement.

3. Means for indicating inclinations comprising a casing having a slot, an oscillatory drum in said casing, means for oscillating said drum and means for supporting said drum, comprising a shaft movable in said slot toward and away from its oscillating means and means for retaining said shaft in horizontal position.

Signed at the city, county and State of New York, this 6 day of Oct., 1921.

ALFRED T. HESPE.